(12) United States Patent
Yoshino et al.

(10) Patent No.: US 12,332,002 B2
(45) Date of Patent: Jun. 17, 2025

(54) CIRCULATING COOLING WATER TREATMENT METHOD AND COOLING PERFORMANCE

(71) Applicant: KURITA WATER INDUSTRIES LTD., Tokyo (JP)

(72) Inventors: Takanori Yoshino, Tokyo (JP); Takashi Kikkawa, Tokyo (JP); Kazuhisa Fujita, Tokyo (JP); Natsumi Taniyama, Tokyo (JP); Marina Yanagida, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 182 days.

(21) Appl. No.: 18/031,008

(22) PCT Filed: Oct. 6, 2021

(86) PCT No.: PCT/JP2021/036898
§ 371 (c)(1),
(2) Date: Apr. 10, 2023

(87) PCT Pub. No.: WO2022/080198
PCT Pub. Date: Apr. 21, 2022

(65) Prior Publication Data
US 2023/0375291 A1    Nov. 23, 2023

(30) Foreign Application Priority Data
Oct. 13, 2020  (JP) .................................. 2020-172321

(51) Int. Cl.
*F28F 23/00*  (2006.01)
*C09K 5/20*   (2006.01)
*F28F 25/00*  (2006.01)

(52) U.S. Cl.
CPC ............... *F28F 23/00* (2013.01); *C09K 5/20* (2013.01); *F28F 2025/005* (2013.01)

(58) Field of Classification Search
CPC ...... F28F 23/00; F28F 2025/005; F28F 13/02; F28F 19/00; F28F 13/18; C09K 5/20; C09K 5/10; F28C 1/00; F28C 1/02; F28G 9/00; F28G 13/00
See application file for complete search history.

(56) References Cited

FOREIGN PATENT DOCUMENTS

| | | |
|---|---|---|
| CA | 2216379 | 10/1996 |
| CN | 101675152 | 3/2010 |
| CN | 101932389 | 12/2010 |
| CN | 102395383 | 3/2012 |
| JP | S47-040445 | 12/1972 |
| JP | S48-039457 | 11/1973 |
| JP | 2002-372339 | 12/2002 |
| JP | 2003-090892 | 3/2003 |
| JP | 2005-188901 | 7/2005 |
| JP | 2005291658 | 10/2005 |
| JP | 2006-105541 | 4/2006 |
| JP | 2006-242390 | 9/2006 |
| JP | 2006-242511 | 9/2006 |
| JP | 2006242511 A * | 9/2006 |
| JP | 2009-226280 | 10/2009 |
| JP | 2009226280 A * | 10/2009 |
| JP | 2011-117684 | 6/2011 |
| WO | WO-9631749 A1 * | 10/1996 ............ B01F 3/0861 |
| WO | 2008137785 | 11/2008 |
| WO | 2009101575 | 8/2009 |
| WO | 2010120568 | 10/2010 |

OTHER PUBLICATIONS

Kao Corporation Safety Summary; Polyoxyalkylene alkyl ether. URL:https://ssl.kao.com/en/chemical/ (Year: 2015).*
"Office Action of China Counterpart Application", issued on Nov. 29, 2023, with English translation thereof, pp. 1-12.
"Search Report of Europe Counterpart Application", issued on Oct. 8, 2024, pp. 1-6.
"Office Action of Korea Counterpart Application", issued on Oct. 30, 2024, with English translation thereof, pp. 1-11.
"Notice of Reasons for Refusal of Japan Counterpart Application", issued on Nov. 24, 2021, with English translation thereof, pp. 1-6.
"International Search Report (Form PCT/ISA/210) of PCT/JP2021/036898," mailed on Nov. 30, 2021, with English translation thereof, pp. 1-4.
"Written Opinion of the International Searching Authority (Form PCT/ISA/237) of PCT/JP2021/036898," mailed on Nov. 30, 2021, with English translation thereof, pp. 1-5.
"Office Action of Indonesia Counterpart Application", issued on Dec. 11, 2024, with English translation thereof, p. 1-p. 6.
"Office Action of Brazil Counterpart Application", issued on Mar. 6, 2025, with English translation thereof, pp. 1-6.

* cited by examiner

Primary Examiner — Emmanuel E Duke
(74) Attorney, Agent, or Firm — JCIPRNET

(57) ABSTRACT

The present invention provides a technique for improving the cooling performance of a cooling tower in a circulating cooling water system having the cooling tower. The present invention provides a method for improving cooling performance of a cooling tower in a circulating cooling water system having the cooling tower, wherein cooling water used in the circulating cooling water system is cooling water to which an agent including a surfactant is added, and the cooling water satisfies (a) a dynamic contact angle of 55° or less and (b) a bubble bulkiness of 250 mL or less.

12 Claims, 1 Drawing Sheet

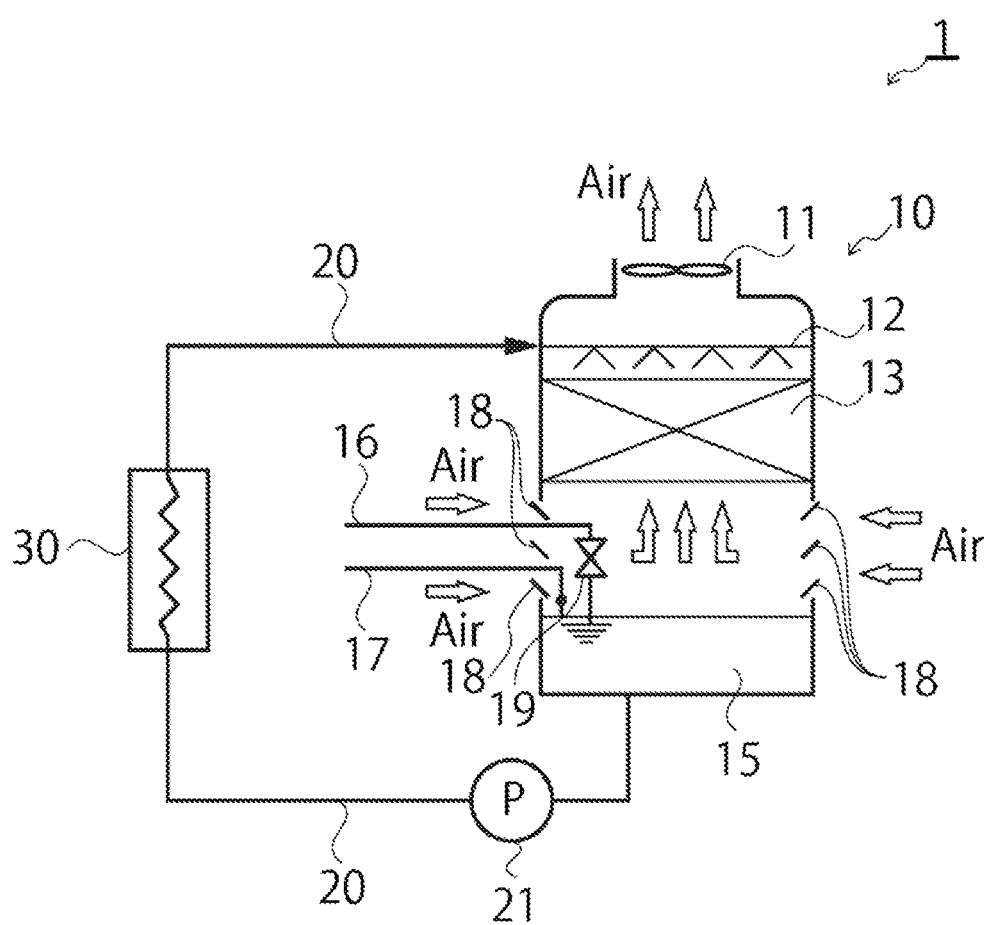

CIRCULATING COOLING WATER TREATMENT METHOD AND COOLING PERFORMANCE

CROSS-REFERENCE TO RELATED APPLICATION

This application is a 371 application of the International PCT application serial no. PCT/JP2021/036898, filed on Oct. 6, 2021, which claims the priority benefit of Japan Patent Application No. 2020-172321, filed on Oct. 13, 2020. The entirety of each of the above-mentioned patent applications is hereby incorporated by reference herein and made a part of this specification.

TECHNICAL FIELD

The present invention relates to a method for treating circulating cooling water and a method for improving cooling performance.

BACKGROUND ART

In air conditioning equipment in buildings, regional facilities, and the like, industrial plants, and the like, water-cooled heat exchangers are used in order to cool various types of fluids. This heat exchanger is configured to indirectly cool a heat source that is a load in a source of heat generation in a building air conditioner or the like. This heat exchanger includes a circulating water channel connected to a cooling tower, and the cooling water in this circulating water channel circulates between the heat exchanger and the cooling tower to cool the heat source. In more detail, this circulating cooling water passes through the heat exchanger to receive heat and have high temperature, this cooling water having high temperature is cooled in the cooling tower, and the cooled cooling water is transferred from the cooling tower to the heat exchanger again using a pump or the like. In this manner, usually, a circulating cooling water system is provided with a heat exchanger, a cooling tower, and a circulating water channel through which cooling water circulates between the heat exchanger and the cooling tower, and configured to cool a heat source as described above.

The most typical water system possessing a cooling tower is an open circulating cooling water system. The open circulating cooling water of this is used in a heat exchanger in order to cool a refrigerant in a refrigerator, a process fluid in a chemical complex, or the like. The heat that the open circulating cooling water receives in the heat exchanger is allowed to cool by evaporating some of the cooling water in the open type cooling tower, and this cooling water is reused for cooling in the heat exchanger. Such a step is repeatedly performed to operate the open circulating cooling water system.

In the open circulating cooling water system, in the open type cooling tower, some of the cooling water is evaporated in the filler region for the cooling of the cooling water, and therefore the dissolved salts and the like included in the cooling water are concentrated by this evaporation. The dissolved salts concentrated in the cooling water are often seen to precipitate in the cooling water as scale in the circulating cooling water system (in the circulating water channel, in the heat exchanger, and in the cooling tower) and adhere in the flow channel or the apparatus. This scale inhibits the heat transfer in the heat exchanger, and therefore methods for properly managing the concentration factor of cooling water in an open circulating cooling water system, methods for adding a scale preventive, and the like are generally carried out so that scale does not adhere in the circulating water channel of the heat exchanger.

In addition, microorganisms (for example, bacteria, fungi, and algae), particulate matter (for example, PM 2.5 and sand), and the like are included in makeup water supplied in order to compensate for evaporated cooling water, the air used for cooling, and the like, and therefore the microorganisms and the like included in these are likely to contaminate the open circulating cooling water system. The contaminating microorganisms and the like may form slime on the surface in the circulating water channel included in the heat exchanger and inhibit the heat transfer in the heat exchanger.

In order to prevent this, methods for adding a slime control agent so that slime does not adhere are also generally carried out.

For example, PTL1 discloses a heat exchanger using a photocatalyst that can stably exhibit antifouling properties, corrosion resistance, and the like over a long period regardless of the refrigerant.

For example, PTL2 discloses a circulating cooling water recycling apparatus using a photocatalyst that more effectively carries out the decomposition of organic matter included in circulating water such as cooling water, and the prevention of the occurrence and proliferation of algae and bacteria, which are the causes of the formation of slime and scale, using a photocatalyst technique.

For example, PTL3 discloses equipment used for the heat exchange of circulating water inside a cooling tower that can provide an improvement for inhibiting the accumulation and propagation of scale, bacteria such as *Legionella* bacteria, and the like on a filler and attached equipment with which the circulating water comes into contact, without requiring new equipment or installation space.

For example, PTL4 discloses a heat transfer pipe for an absorption type refrigerator having a hydrophilization performance coating film in order to promote the improvement of the heat exchange performance of an absorption type refrigerator.

For example, PTL5 discloses promoting the improvement of thermal efficiency in a heat transfer system including any of a steam dryer, a heat exchanger, and a heating element covering pipe.

For example, PTL6 discloses that the outdoor unit of an air conditioning apparatus including an air heat exchanger for cooling by the air a refrigerant compressed by a compressor, to condense and liquefy the refrigerant, and water spraying means for spraying water on the air heat exchanger is characterized in that the water to be sprayed on the air heat exchanger is provided with a surfactant for improving the wettability on the air heat exchanger.

CITATION LIST

Patent Literature

PTL1: JP 2006-242390 A
PTL2: JP 2006-242511 A
PTL3: JP 2011-117684 A
PTL4: JP 2002-372339 A
PTL5: JP 2003-90892 A
PTL6: JP 2006-105541 A
PTL7: JP 2005-188901 A

SUMMARY OF INVENTION

Technical Problem

With the techniques described in PTL1 to PTL3, even if the cooling performance when a circulating cooling water system is newly provided can be maintained, the cooling performance cannot be more improved.

The techniques described in PTL4 and PTL5 are techniques dedicated to particular heat transfer systems and are not techniques that can be utilized for open circulating cooling water systems as a whole.

For PTL6, as the air heat exchanger for cooling by the air a refrigerant compressed by a compressor, to condense and liquefy the refrigerant is used as an essential configuration, this is a technique for improving heat transfer performance in an air-cooled refrigerant condenser and is not a technique for improving the cooling performance of a water spraying type cooling tower (for example, a cooling tower in which cooling water is sprayed on a filler by water spraying means located above).

Accordingly, the present inventors have decided to study techniques for improving the cooling performance of a cooling tower in a circulating cooling water system having the cooling tower, from a new point of view.

That is, it is a main object of the present invention to provide a technique for improving the cooling performance of a cooling tower in a circulating cooling water system having the cooling tower.

Solution to Problem

Here, in terms of the structure of a cooling tower, when cooling water falls from a filler into a pit storing cooling water, the cooling water strikes the water surface in the pit, and therefore a larger amount of bubbling occurs due to the addition of a surfactant to the cooling water, and therefore the bubbles scatter out of the cooling tower, which can cause trouble such as the fouling of the neighborhood environment with the surfactant. Therefore, it has usually been considered very difficult to apply a surfactant to a circulating cooling water system having a water spraying type cooling tower.

In addition, the present inventors have also studied use in combination with a defoaming agent. When a defoaming agent is added in a circulating cooling water system, it is necessary to newly add a defoaming agent adding apparatus, but such addition is also difficult from the viewpoint of the limitation of installation space, and cost effectiveness. In addition, when a one-component agent in which a surfactant and a defoaming agent are used in combination is used in a circulating cooling water system, it is necessary to store this one-component agent for a long period, but it is considered that for the one-component agent in which a surfactant and a defoaming agent are used in combination, quality deterioration during storage is likely to occur, and the effect of the surfactant originally expected reduces.

Further, the present inventors have studied whether or not a surfactant can be actually applied to a circulating cooling water system having a cooling tower, and as a result, it has been actually impossible to improve the cooling performance of a cooling tower in a circulating cooling water system having the cooling tower even by the simple use of a surfactant, as shown in Comparative Examples 2 to 6 in [Examples] described later.

However, the present inventors have paid attention not only to a surfactant used in a cooling tower but also to the properties of cooling water when a surfactant is added, and diligently studied the properties of cooling water circulating through a cooling tower in a circulating cooling water system. As a result, the present inventors have newly found a technique that can improve the cooling performance of a cooling tower in a circulating cooling water system having the cooling tower by adjusting and controlling the dynamic contact angle and bubble bulkiness of cooling water circulating in a circulating cooling water system. Further, the present inventors have also newly found that circulating cooling water that can improve the cooling performance of a cooling tower can be prepared and used in a circulating cooling water system. Further, from this result, the present inventors have also newly found that the operation of a circulating cooling water system can be easily performed.

That is, the present invention is as follows.

The present invention provides a method for improving cooling performance of a cooling tower in a circulating cooling water system having the cooling tower, wherein cooling water used in the circulating cooling water system is cooling water to which an agent including a surfactant is added, and the cooling water satisfies (a) a dynamic contact angle of 55° or less and (b) a bubble bulkiness of 250 mL or less.

In addition, the present invention provides a method for preparing cooling water used in a circulating cooling water system having a cooling tower, including adding an agent including a surfactant to cooling water in the circulating cooling water system to prepare cooling water having (a) a dynamic contact angle of 55° or less and (b) a bubble bulkiness of 250 mL or less.

In addition, the present invention provides a method for operating a circulating cooling water system having a cooling tower, including adding an agent including a surfactant so that cooling water used in the circulating cooling water system satisfies (a) a dynamic contact angle of 55° or less and (b) a bubble bulkiness of 250 mL or less.

The surfactant may be a nonionic surfactant.
The surfactant may be a nonionic ether-based surfactant.
The surfactant may be a polyoxyalkylene alkyl ether.
The cooling water may have a dynamic contact angle of 52° or less and a bubble bulkiness of 230 mL or less.

Advantageous Effects of Invention

According to the present invention, it is possible to provide a technique for improving the cooling performance of a cooling tower in a circulating cooling water system having the cooling tower.

The effect of the present invention is not necessarily limited to the effect described here and may be any effect described herein.

BRIEF DESCRIPTION OF DRAWING

FIGURE is a schematic view showing one example of a circulating cooling water system having a cooling tower according to the present invention.

DESCRIPTION OF EMBODIMENTS

Modes for carrying out the present invention will be described below. The embodiments described below show examples of typical embodiments of the present invention, and the scope of the present invention is not construed as limited by these. The upper limit value and lower limit value of numerical values can be arbitrarily combined as desired.

1. Method for Improving Cooling Performance of Cooling Tower

The present invention can provide a method for improving the cooling performance of a cooling tower in a circulating cooling water system having the cooling tower, wherein the cooling water is cooling water to which an agent including a surfactant is added, and the cooling water satisfies (a) a dynamic contact angle of 55° or less and (b) a bubble bulkiness of 250 mL or less.

1-1. <Improvement of Cooling Performance of Cooling Tower>

"The improvement of the cooling performance of the cooling tower" in the present invention means that in the cooling tower, the cooling performance for cooling the circulating cooling water can be improved. Further, in the present invention, such cooling water that in the cooling tower, an increase of bubbles can be inhibited, and a certain volume or more of bubbling is not caused is more preferred from the viewpoint of the inhibition of the trouble due to the bubbling in the cooling tower, and the like.

By the improvement of the cooling performance of the cooling tower by the present invention, more cooled cooling water can be fed from the cooling tower to a circulating water channel in a heat exchanger, and thus the heat transfer efficiency in the heat exchanger can be more improved.

Further, the cooling performance of the cooling tower can be improved without causing the problem of foaming, and therefore the operation or management of the cooling tower and the circulating cooling water system having this can also be easily performed.

1-1-1. [Indicators of Performance in Cooling Tower]

"The cooling performance for cooling the circulating cooling water can be improved" means that the cooling temperature of the cooling water when it is prepared as in the present invention increases more compared with the cooling temperature of unprepared cooling water.

The "cooling temperature" is the temperature difference when from (1) the water temperature (° C.) when the circulating cooling water passing through the heat exchanger and heated enters the inlet of the cooling tower, (2) the water temperature (° C.) when the circulating cooling water exits the outlet of the cooling tower after the circulation of the cooling water for a predetermined period is subtracted. "The cooling temperature increases" means that this temperature difference is a positive value and becomes large.

Further, as shown in [Examples] described later, a relationship is noted between an increase in the cooling temperature of the cooling water and a decrease in the dynamic contact angle of the cooling water in the cooling tower, and further a relationship is noted between the presence or absence of an increase of bubbles and the inhibition of the bubble bulkiness of the cooling water in the cooling tower.

From these, examples of the "indicators of performance in the cooling tower" used in the present invention include, but are not limited to, the cooling temperature and dynamic contact angle of the cooling water as "cooling performance" and bubble bulkiness as "bubbling inhibition performance".

When the cooling performance of the cooling tower is improved in the present invention using the agent including the surfactant, both the (a) dynamic contact angle and the (b) bubble bulkiness are more preferably used as indicators. When both the (a) dynamic contact angle and the (b) bubble bulkiness are used as indicators, the circulating cooling water system can be more easily operated from the viewpoint that the agent including the surfactant is easily adjusted, and while bubbling is inhibited, cooling performance improvement is also easy.

1-2. <Circulating Cooling Water System Having Cooling Tower>

The circulating cooling water system used in the present invention is not particularly limited and is preferably a water system including in the system a cooling tower installed, for example, in an air conditioner, a petrochemical complex, or a general factory. In the present invention, the circulating cooling water system is preferably configured to indirectly cool a heat source generated in an air conditioner, a petrochemical complex, or a general factory and may be a general water system configured to include a heat exchanger, a circulating water channel, and a cooling tower.

The circulating cooling water system used in the present invention may be either an open circulating cooling water system or an enclosed circulating cooling water system. The open circulating cooling water system preferably has such a configuration that cooling water can circulate in an open type, and the enclosed circulating cooling water system (also referred to as a closed circulating cooling water system) preferably has such a configuration that cooling water can circulate in an enclosed type.

The cooling tower used in the present invention may be either an open type cooling tower or an enclosed type cooling tower, and these cooling towers may adopt the configurations or mechanisms of known cooling towers. The cooling tower is more preferably a water spraying type cooling tower including at least water spraying means and a filler region. The performance (for example, cooling capacity and the amount of water treated) of the cooling tower varies with the scale of the factory, the purpose of use, and the like, but with the method of the present invention, the properties of the cooling water when the surfactant is added are prepared and controlled, and therefore the cooling performance can be improved for various cooling towers.

The cooling tower used in the present invention is preferably a cooling tower configured so that cooling water is sprayed on a filler below by means located above, and the sprayed cooling water circulates.

In the present invention, systems or means may be apparatuses or treatment apparatuses.

The present invention has the effect of being able to solve both the problem of cooling performance improvement in cooling towers and problems due to bubbling properties that arise in cooling towers, by preparing particular cooling water using a surfactant. These can be solved by the particular cooling water prepared in this manner, and therefore an advantage is that the particular cooling water can also be easily applied to general circulating cooling water systems and existing circulating cooling water systems.

An advantage of the method of the present invention is that as a more preferred mode, use for open circulating cooling water systems having water spraying type cooling towers can reduce bubble scattering and the like likely to be problems particularly in the water spraying type, and therefore the method of the present invention is preferred. The water spraying type cooling towers include enclosed type cooling towers and open type cooling towers.

1-2-1. <Enclosed Type Cooling Tower and Enclosed Circulating Cooling Water System>

The enclosed type cooling tower and the enclosed circulating cooling water system used in the present invention are not particularly limited but preferably have the following configurations. The enclosed circulating cooling water system may include a single enclosed type cooling tower or a plurality of enclosed type cooling towers.

A first example of the enclosed type cooling tower includes an enclosed type cooling tower including air blowing means including a fan for taking the air in the cooling tower, passing it through a cooling region, and discharging it out of the cooling tower, and the like; water spraying means including a water spraying pipe for water spraying; a cooling region including a cooling water coil, piping for coupling from the cooling water coil to a cooler, and the like; a louver for taking the air to the side of the cooling region; a pit including a lower water tank for storing sprayed water passing through the cooling region, and the like; and the like, the enclosed type cooling tower being configured so that the sprayed water circulates from the lower water tank by a pump and is reused for water spraying (see, for example, FIG. 11 and paragraph [0011] of PTL7). The configuration of the cooling tower can also be adopted for the water spraying type.

A second example of the enclosed type cooling tower includes a cooling tower that cools circulating water (first cooling water) by indirect cooling using a coil made of a metal such as copper and includes air blowing means, water spraying means, a filler region, and a pit in order from above. Further, the water spraying means is preferably configured to spray second cooling water on the filler region located below the water spraying means. The pit is preferably configured to store this sprayed water in the pit located in the lower part. The second cooling water is preferably configured to circulate and be used as cooling water again. Further, the filler region is a region in which a metal coil layer and a filler (for example, PVC) layer are laminated, and is preferably configured so that the air is taken in from the side of the cooling tower and passed through the filler region, and the passed air is discharged out by the air blowing means. By the contact of the second cooling water and the air with the filler region, the coil layer of the filler region can be cooled, and the cooling water can be cooled by the air. The configuration of the cooling tower can also be adopted for the water spraying type.

For the "closed type cooling tower", the "enclosed circulating cooling water system", and the "enclosed circulating cooling water system having the enclosed type cooling tower" according to an embodiment of the present invention, the description of the configurations of the means, the members, the dynamic contact angle, the bubble bulkiness, the surfactant, and the like common to the configurations of the "closed type cooling tower", the "enclosed circulating cooling water system", and the "enclosed circulating cooling water system having the enclosed type cooling tower" according to the embodiment of the present invention and the configurations of the above "1-1." and "1-2." and the following "1-2-2." and subsequent sections is appropriately omitted, but the description of the "1-1.", "1-2.", "1-2-2." and subsequent sections, and the like also applies to this embodiment, and the description can be appropriately adopted.

1-2-2. <Open Type Cooling Tower and Open Circulating Cooling Water System>

The details of the open type cooling tower and the open circulating cooling water system used in the present invention will be described below, but as described above, the cooling tower used in the method of the present invention is not limited to an open type cooling tower and may be an enclosed type cooling tower. The open circulating cooling water system may include a single open type cooling tower or a plurality of open type cooling towers. The cooling tower is preferably a water spraying type including water spraying means, air blowing means, and a filler region.

The open circulating cooling water system in the present invention may have such a configuration or mechanism that it further includes a single enclosed type cooling tower or a plurality of enclosed type cooling towers in addition to the open type cooling tower, and these may be combined to perform the cooling of a heat source.

The open circulating cooling water system having the open type cooling tower used in the present invention preferably includes at least an open type cooling tower, a heat exchanger, and a circulating water channel and is configured to cool a heat source, for example, as shown in FIGURE. The present invention has the effect of being able to improve the performance of the open type cooling tower by the properties of the cooling water to which the agent including the surfactant is added.

In the present invention, circulation operation is performed using cooling water having both heat dissipation efficiency improvement and low foamability, and therefore it does not matter whether the open type cooling tower used in the present invention is a known apparatus or a novel apparatus, and further the open type cooling tower used in the present invention is not particularly limited by the apparatus such as the apparatus performance such as cooling treatment capacity, the apparatus scale, and the apparatus model. The method of the present invention can also be easily used for general open type cooling towers.

The open type cooling tower used in the present invention is not particularly limited, and examples thereof include, but are not limited to, a counterflow type (circular) and a crossflow type (square). Of these, the counterflow type is preferred.

For the open type cooling tower, it is preferred that a heat exchanger is arranged outside the cooling tower, and the cooling tower has a circulating water channel arranged so that cooling water can circulate between the cooling tower and the heat exchanger. The open type cooling tower more preferably includes a transfer pump for circulation so that the cooling water can circulate. Thus, the cooling water cooled in the open type cooling tower is transferred to the heat exchanger through the circulating water channel, and the cooling water heated in the heat exchanger is transferred to the open type cooling tower through the circulating water channel. Further, various types of measuring apparatuses such as a water temperature meter, a pH meter, a dynamic contact angle measuring apparatus, and a bubble bulkiness measuring apparatus may be provided at the inlet and/or outlet of the open type cooling tower connected to the circulating water channel.

Air blowing means, water spraying means, a filler region, and a pit are preferably provided in the open type cooling tower, and makeup water supply means and agent injection means may be further provided. Further, a control part for controlling the open type cooling tower is preferably provided inside or outside the circulating cooling water system. For example, a computer, a database, a cloud system, or a network system may be on the inside or outside.

The air blowing means preferably includes an air blower and is configured to blow air into the filler region. The water spraying means preferably includes a water spraying pipe and is configured to spray cooling water on the filler region. The filler region preferably includes a plurality of fillers. The pit preferably includes a cooling water storage tank and is configured so that the cooling water is cooled, and the cooling water to be transferred to the heat exchanger can be stored.

As one example of a more preferred mode, the open type cooling tower is a cooling tower that cools open circulating cooling water passing through a heat exchanger, includes water spraying means for spraying the cooling water on a filler, air blowing means for blowing the air into the filler, and a filler region including the filler configured to cool the cooling water by bringing the cooling water into contact with the air to evaporate it, and is configured so that an agent including a surfactant can be added to the cooling water.

From the viewpoint of cooling performance improvement, the open type cooling tower more preferably has a filler region in which a plurality of fillers are configured in a laminated form so that while the cooling water is in contact with the filler surface, some of the cooling water is evaporated, and the remaining cooling water can pass through the filler region.

The arrangement of the filler region in the open type cooling tower is not particularly limited, and the filler region may be arranged in the upper region or inner peripheral region of the cooling tower.

In the present invention, it is preferred that the filler region is provided in the upper region of the cooling tower, and the air blowing means, the water spraying means, the filler region, and the pit are arranged in order from the upper part of the cooling tower. Further, it is preferred that in the cooling tower, a space is provided between the filler region and the pit, and a gap through which the air can flow in from the outside is provided.

The base material of the filler is not particularly limited, and examples thereof include those made of synthetic resins and made of metals (for example, those made of aluminum and made of copper). Those made of synthetic resins (for example, those made of polyvinyl chloride resins and made of polypropylene resins) are preferred, those made of polyvinyl chloride resins are more preferred, and further those made of hard vinyl chloride resins are further preferred. The filler contact method is not particularly limited as long as it is a contact method configured to be able to cool cooling water. Examples of the filler contact method include splash type (droplet type) and film type (water film type) contact methods, and the film type contact method is preferred.

Further, a makeup water supply flow channel for supplying makeup water for compensating for the loss due to the evaporation and scattering of the cooling water, and an agent injection flow channel for injecting an agent into the cooling water are preferably connected to the open type cooling tower.

A water source, a pump for transferring water from the water source, and the like are connected to the makeup water supply flow channel, and makeup water supply means including these and configured to supply makeup water to the water system is preferably provided in the open circulating cooling water system. By the supply of the makeup water, the water level in the pit of the cooling tower can be kept constant, and stable operation in the open circulating cooling water system can be performed.

An agent tank, a pump for transferring an agent from the agent tank, and the like are connected to the agent injection flow channel, and agent supply means including these configured to inject various types of agents into the water system is preferably provided in the open circulating cooling water system. By the supply of the agent, the agent can be injected into the cooling water in the pit. The agent is not particularly limited, and examples thereof include agents including surfactants, corrosion preventives, scale formation inhibitors, and slime formation inhibitors. One or two or more selected from the group consisting of these can be used. By scale formation inhibition with such an agent, and the like, stable operation can be performed in the open circulating cooling water system.

1-3. <Properties of Cooling Water to which Agent Including Surfactant is Added>

The cooling water used in the present invention is preferably cooling water to which an agent including a surfactant is added. The description of the agent including the surfactant will be described later. The cooling water can be used in water spraying type cooling towers and further may be used in either open type or enclosed type cooling towers, but the open type is preferred. The cooling water may be for either open or enclosed circulating cooling water systems, but open circulating cooling water systems are preferred.

The cooling water to which the agent including the surfactant is added preferably has (a) a dynamic contact angle (°) in a particular range or less and (b) a bubble bulkiness (mL) in a particular range or less. When the cooling water has such properties, the wettability between the filler provided in the cooling tower and the cooling water can be improved. By improving the wettability, the temperature of the cooling water that can be cooled by the cooling tower can be made larger, and thus the cooling performance of the cooling tower can be improved. An advantage is that by the properties of the cooling water used in the present invention, the cooling performance of the cooling tower is improved, and the occurrence of problems due to the bubbling of cooling water can be inhibited.

The properties of the cooling water used in the present invention preferably satisfy (a) a dynamic contact angle of 55° or less and (b) a bubble bulkiness of 250 mL or less.

A more preferred (a) dynamic contact angle of the cooling water is preferably 56° or less, more preferably 55° or less, further preferably 53° or less, still more preferably 52° or less, and more preferably 50° or less, and as the (a) dynamic contact angle of the cooling water becomes 40° or less, 30° or less, 20° or less, 10° or less, and 5° or less, it is still more preferred from the viewpoint of cooling performance improvement. From the viewpoint of the reduction of the amount of the agent used, and bubbling inhibition, the dynamic contact angle of the cooling water is preferably 5° or more, more preferably 10° or more, further preferably 30° or more, still more preferably 40° or more, and more preferably 50° or more.

A more preferred (b) bubble bulkiness of the cooling water is preferably 300 mL or less, more preferably 280 mL or less, further preferably 250 mL or less, still more preferably 230 mL or less, and more preferably 200 mL or less, and as the (b) bubble bulkiness of the cooling water becomes 100 mL or less and 50 mL or less, it is still more preferred from the viewpoint of bubbling inhibition. From the viewpoint of wettability improvement, the bubble bulkiness of the cooling water is preferably 100 mL or more, more preferably 200 mL or more.

The properties of the cooling water used in the present invention are more preferably (a) a dynamic contact angle of 53° or less and (b) a bubble bulkiness of 230 mL or less, further preferably (a) a dynamic contact angle of 50° to 52° and (b) a bubble bulkiness of 200 to 230 mL.

A preferred mode when the (a) dynamic contact angle and the (b) bubble bulkiness in the present invention are measured will be shown below.
(a) The dynamic contact angle (°) of the cooling water is preferably the dynamic contact angle of the cooling water to which the agent is added (4 μL, 25° C.), 1 s after dropping when the cooling water is dropped on a test plate at room temperature (25° C.).

(b) The bubble bulkiness (mL) of the cooling water is preferably the bubble bulkiness when 300 mL of the cooling water to which the agent is added is aerated at 2 mL/min for 20 s.

"The cooling water to which the agent is added" for the (a) dynamic contact angle and (b) bubble bulkiness is preferably measured after the cooling water is circulated between the cooling tower and the heat exchanger so that the cooling water in the water system has a generally uniform concentration, after the agent is added to the cooling water. Further, the cooling water collected under conditions in which the fan of the air blowing means in the cooling tower rotates is preferably measured.

In [Examples] described later, when an agent is added to cooling water in a water system, and then the cooling water to which the agent is added is circulated in the circulating cooling water system for a certain time, the cooling temperature and the state of bubbling are constant. Therefore, the circulation time for the measurement may be appropriately adjusted according to the cooling tower used. The circulation time after the addition of the agent is, for example, more preferably 20 min or more, further preferably 30 min or more, and still more preferably 30 to 60 min when an open type cooling tower in which the amount of water treated is 100 to 150 L/min is used.

"The cooling water to which the agent is added" for the (a) dynamic contact angle and (b) bubble bulkiness may be of the same period or different periods.

The "test plate" in the (a) is preferably a plate made of a synthetic resin, more preferably a plate made of a polyvinyl chloride resin, and further preferably a plate made of a hard vinyl chloride resin.

The "test plate" in the (a) is preferably the same material as the material of the filler provided in the cooling tower, from the viewpoint of being able to prepare more suitable cooling water.

For the "test plate" in the (a), a test plate on which the dynamic contact angle is 67 to 73° when measured with pure water is preferably used, and the measuring apparatus at this time is preferably DAT1100 MkII Dynamic Absorption Tester manufactured by FIBRO.

The dynamic contact angle in the (a) is preferably a value obtained by the measurement method in accordance with ASTM D5725 and is preferably a value obtained by image analysis by a CCD camera, and the measurement time is 1 s as in the (a).

The dynamic contact angle in the (a) is more preferably a dynamic contact angle (°) in accordance with ASTM D5725 with a measurement time of 1 s using image analysis by a CCD camera.

Further, a more preferred specific method for measuring the "(a) the dynamic contact angle (°) of the cooling water" is as described in <Dynamic Contact Angle Evaluation Test> in [Examples] described later, and this can be referred to.

The bubble bulkiness in the (b) is preferably the bubble bulkiness when 300 mL of the cooling water (25° C.) to which the agent is added is placed in a graduated cylinder having a volume of 1 L, and then aerated at 2 mL/min for 20 s using an air diffusing pipe.

The "graduated cylinder having a volume of 1 L" in the (b) is preferably one with an inner diameter of 58 mm, a mark of 10 mL, and ASTM tolerance: 6±mL. The air diffusing pipe is preferably arranged at the bottom of the graduated cylinder having a volume of 1 L.

The air diffusing pipe in the (b) is preferably one having a filter diameter of 20 mm, a pipe diameter of 8 mm, and pores of 20 to 30 μm.

Further, a more preferred specific method for measuring the "(b) bubble bulkiness (mL) of the cooling water" is as described in <Foamability Evaluation Test> in [Examples] described later, and this can be referred to.

The content of the surfactant in the cooling water to which the agent including the surfactant is added used in the present invention is not particularly limited, but its preferred lower limit value is preferably 10 mg/L or more, more preferably 50 mg/L or more, further preferably 150 mg/L or more, still more preferably 200 mg/L or more, more preferably 250 mg/L or more, and further preferably 300 mg/L or more, and its preferred upper limit value is preferably 1000 mg/L or less, more preferably 900 mg/L or less, further preferably 800 mg/L or less, still more preferably 600 mg/L or less, and more preferably 500 mg/L or less. The concentration of the surfactant is more preferably 10 to 900 mg/L, further preferably 10 to 500 mg/L, as a preferred numerical value range. From the viewpoint of making the environmental load small, the amount of the surfactant used is preferably a concentration as low as possible.

The pH (25°) of the cooling water to which the agent including the surfactant is added used in the present invention is not particularly limited but is preferably 6.5 to 10.0, more preferably 7.0 to 9.5, and further preferably 7.5 to 9.0. The water temperature of the cooling water is not particularly limited but is preferably in the range of 10 to 50° C.

1-4. <Agent Including Surfactant>

The agent used in the present invention is an agent including at least a surfactant. For cooling water to which the agent is added, the wettability on the filler can be improved. Further, the agent including the surfactant can be added so as to satisfy the conditions of "(a) the dynamic contact angle (°) of the cooling water" and "(b) the bubble bulkiness (mL) of the cooling water" described above, to prepare cooling water. For this prepared cooling water, the bubble bulkiness can be inhibited while the cooling temperature in the cooling tower is increased. This prepared cooling water can be cooling water for use for the improvement of the cooling performance of the cooling tower. Further, for this prepared cooling water, the cooling performance of the cooling tower can be improved, and the bubbling in the cooling tower is also inhibited, and therefore the operation of the cooling tower is also easy. The agent used in the present invention can be applied for wetting improvement, for low foaming, for cooling performance improvement, and the like. The agent is preferably used in water spraying type cooling towers. The agent may be used in either open type or enclosed type cooling towers, but the open type is preferred. The agent may be for either open or enclosed circulating cooling water systems, but open circulating cooling water systems are preferred.

The surfactant used in the present invention is not particularly limited, and examples thereof include anionic surfactants, cationic surfactants, nonionic surfactants, and amphoteric surfactants. One or two or more selected from the group consisting of these may be used as the agent.

By selecting such a surfactant as to satisfy the conditions of "(a) the dynamic contact angle of the cooling water" and "(b) the bubble bulkiness of the cooling water" described above in the present invention, advantages are that even a one-component agent including a surfactant can have the properties of both heat dissipation efficiency improvement and low foamability, and from the viewpoint of ensuring the stability of the agent for a long period, a defoaming agent need not be contained in the agent so as to be able to exhibit a defoaming effect.

Illustrations of each are given below, but the surfactant used in the present invention is not limited to these. The surfactant may be produced by a known production method, or a commercial product may be used. The salt used in these is not particularly limited, and examples thereof include alkali metal salts (for example, lithium, sodium, and potassium), alkaline earth metal salts (for example, calcium and magnesium), and primary to quaternary ammonium salts. One or two or more selected from the group consisting of these may be used.

The anionic surfactant is not particularly limited, and examples thereof include alkylbenzenesulfonic acids and salts thereof, alpha-olefinsulfonic acids and salts thereof, alkyl sulfates and salts thereof, polyoxyalkylene alkyl ether sulfuric acids and salts thereof, N-acylmethyl-β-alanines and salts thereof, N-acylmethyltaurines and salts thereof, polyoxyalkylene alkyl ether acetic acids and salts thereof, alkylsulfosuccinic acids and salts thereof, polyoxyalkylene alkyl ether sulfosuccinic acid half-ester salts, fatty acid soaps, polyoxyalkylene allyl phenyl ether sulfuric acids and salts thereof, alkyl diphenyl ether disulfonic acids and salts thereof, alkylnaphthalenesulfonic acids and salts thereof, alkyl phosphates and salts thereof, and polyoxyalkylene alkyl ether phosphates and salts thereof. One or two or more selected from the group consisting of these may be used as the agent.

The cationic surfactant is not particularly limited, and examples thereof include alkyltrimethylammonium salts, alkyldimethylbenzylammonium salts, dialkyldimethylammonium salts, alkylbis-2-hydroxyethylmethylammonium salts, polyoxyalkylenealkylammonium salts, tetraalkylammonium salts, trialkylphenylammonium salts, benzyltrialkylammonium salts, and alkylamine acetates. One or two or more selected from the group consisting of these may be used as the agent.

The nonionic surfactant is not particularly limited, and examples thereof include polyoxyalkylene alkyl ethers, polyoxyalkylene secondary alkyl ethers, polyoxyalkylenealkylamines, polyoxyalkylene polystyryl phenyl ethers, polyoxyalkylene cumyl phenyl ethers, polyoxyalkylene naphthyl ethers, polyoxyalkylene fatty acid esters, trimethylolpropane tridecanoate, and polyoxyethylene-polyoxypropylene condensates. One or two or more selected from the group consisting of these may be used as the agent.

The amphoteric surfactant is not particularly limited, and examples thereof include β-alkylaminopropionates, fatty acid amidopropyldimethylaminoacetic acid betaines, 2-alkyl-N-carboxymethyl-N-hydroxyethylimidazolinium betaines, and laurylaminodipropionate. One or two or more selected from the group consisting of these may be used as the agent.

In the present invention, among the surfactants, nonionic surfactants are preferred. Among the nonionic surfactant, ether-based nonionic surfactants are preferred. Further, among these, polyoxyalkylene alkyl ethers are more preferred. For the "alkylene" of the "polyoxyalkylene" in the polyoxyalkylene alkyl ether, 2 to 3 carbon atoms, for example, ethylene and propylene, are preferred. Examples of the "polyoxyalkylene" include ethylene oxide, propyleneoxy, or ethylene oxide-propyleneoxy. The "poly" of the "polyoxyalkylene" is not particularly limited, and examples thereof include 2 to 50, and the "poly" is preferably 2 to 30. The "alkyl" in the polyoxyalkylene alkyl ether may be any of a straight chain, branched chain, or cyclic alkyl. The number of carbon atoms of the "alkyl" is preferably 4 to 30, more preferably 4 to 22, and examples include, but are not limited to, branched chains such as 2-propylheptyl, isononyl, isodecyl, and 2-butylhexyl. For the polyoxyalkylene alkyl ether, one or two or more can be selected from these.

As the agent used in the present invention, an optional component may be appropriately included in addition to the surfactant in a range that does not impair the effect of the present invention. The optional component is not particularly limited, and one or two or more selected from the group consisting of various water treatment agents, for example, a pH adjusting agent, a defoaming agent, an anticorrosive, a scale preventive, a bactericide, and an algicide, may be used. The defoaming agent is preferably not substantially included in the agent used in the present invention from the viewpoint of the storage stability of the agent, and, for example, 0.001% by mass or less is preferred.

The place of the addition of the agent including the surfactant used in the present invention is not particularly limited and may be any place in the circulating cooling water system and may be any single place or plurality of places.

The agent addition place is more preferably the circulating water channel and/or the cooling tower, further preferably the cooling tower and the circulating water channel near the inlet and/or outlet of the cooling tower, and still more preferably the cooling tower. More preferably, the agent including the surfactant is added to the cooling water by agent injection means.

The agent including the surfactant used in the present invention may be continuously or intermittently added to the circulating cooling water system.

For the amount of the agent including the surfactant used in the present invention added, the agent including the surfactant is preferably added so as to satisfy the conditions of "(a) the dynamic contact angle of the cooling water" and "(b) the bubble bulkiness of the cooling water" described above.

For the method for improving cooling performance according to an embodiment of the present invention, the description of "2." and "3." described later, and the like also applies to this embodiment, and the description can be appropriately adopted.

2. Method for Preparing Cooling Water Used in Circulating Cooling Water System Having Cooling Tower For a preparation method according to an embodiment of the present invention, the description of the configurations of the surfactant, the cooling tower, and the like overlapping the configurations of the above "1.", "3." described later, and the like is appropriately omitted, but the description of the "1." and "3.", and the like also applies to this embodiment, and the description can be appropriately adopted.

The present invention can provide a method for preparing cooling water used in a circulating cooling water system having a cooling tower, including adding an agent including a surfactant to the cooling water in the circulating cooling water system to prepare cooling water having (a) a dynamic contact angle of 55° or less and (b) a bubble bulkiness of 250 mL or less. The circulating cooling water system having the cooling tower is preferably an open circulating cooling water system having an open type cooling tower.

The cooling water preferably has the (a) dynamic contact angle of 52° or less and (b) bubble bulkiness of 230 mL or less.

For the surfactant, nonionic surfactants are preferred, and among these, polyoxyalkylene alkyl ethers are more preferred.

The content of the surfactant in the cooling water or the amount of the surfactant used in the cooling water is not particularly limited and may be, for example, 10 to 500 mg/L in the cooling water.

The cooling water obtained by the preparation method of the present invention has wetting improvement action, cooling performance improvement action, and bubbling inhibition action and therefore can be used as cooling water for wetting improvement, cooling water for cooling property improvement, and cooling water for bubbling inhibition. The agent including the surfactant used in the present invention can provide these actions to cooling water.

The cooling water obtained by the preparation method of the present invention can be used for the purposes of wetting improvement action, cooling performance improvement action, and bubbling inhibition action. The cooling water obtained by the preparation method of the present invention can be used in a method for improving wetting, a method for improving cooling performance, and a method for inhibiting bubbling.

The method for preparing cooling water may be used for either open type or enclosed type cooling towers, but the open type is preferred. The method for preparing cooling water may be for either open or enclosed circulating cooling water systems, but open circulating cooling water systems are preferred.

3. Method for Operating Circulating Cooling Water System Having Cooling Tower

For an operation method according to an embodiment of the present invention, the description of the configurations of the surfactant, the cooling tower, and the like overlapping the configurations of the above "1." and "2.", and the like is appropriately omitted, but the description of the "1." and "2.", and the like also applies to this embodiment, and the description can be appropriately adopted.

The present invention can provide a method for operating a circulating cooling water system having a cooling tower, including adding an agent including a surfactant so that the cooling water used in the circulating cooling water system satisfies (a) a dynamic contact angle of 55° or less and (b) a bubble bulkiness of 250 mL or less. The operation method may be applied as a management method. The operation method is preferably used for water spraying type cooling towers. The operation method may be used for either open type or enclosed type cooling towers, but the open type is preferred. The operation method may be for either open or enclosed circulating cooling water systems, but open circulating cooling water systems are preferred.

A more preferred mode will be described with reference to FIGURE, but the present invention is not particularly limited to this.

An open circulating cooling water system 1 has an open type cooling tower 10, a circulating water channel 20 including a transfer pump, and a heat exchanger 30. The open type cooling tower 10 includes air blowing means 11, water spraying means 12, a filler region 13, a space 14 in which the air is taken from the side, and a pit 15 in order from above and further includes makeup water supply means 16 and agent injection means 17. The open type cooling tower 10 may also include the configuration of a water spraying type cooling tower.

The agent including the surfactant used in the present invention is added from the agent injection means 17 to the cooling water stored in the pit 15. This agent and the cooling water can be sufficiently mixed by mixing means such as stirring by a stirring blade or the like, circulation through the flow channel, or pump discharge.

The cooling water including the agent is transferred to the circulating water channel 20 connected to the outlet of the open type cooling tower 10, and transferred to the heat exchanger 30 through the circulating water channel 20 using the transfer pump 21. The cooling water including the agent receives heat from the heat exchanger 30 and is heated when passing through the circulating water channel of the heat exchanger 30. The heated cooling water including the agent is transferred to the open type cooling tower 10 through the circulating water channel 20 connected to the inlet of the open type cooling tower 10.

The transferred cooling water including the agent is sprayed downstream on the filler provided in the filler region 13 located below the air blowing means from the water spraying pipe provided in the water spraying means. On the other hand, the air flowing in from the gaps between louvers 18 located below the filler region 13 is transferred upward by the air blowing means 11, and, at this time, passes through the filler region 13. At this time, some of the cooling water on the filler is evaporated by the air to cause cooling, and the cooling water including the agent is cooled. The cooling water including the agent has improved wettability on the filler and therefore spreads and flows on the surface of the filler, and thus the heat transfer area increases, and the heat exchange efficiency increases more. Thus, the cooling performance of the cooling tower can improve compared with cooling water to which no agent is added.

The cooled cooling water including the agent passes through the filler region 13 and falls hard into the pit 15 in which cooling water is stored below the space 14. At this time, in the pit 15, the bubbling due to the surfactant does not increase in the cooling tower because in the cooling water including the agent including the surfactant, the surfactant is adjusted so that bubbling is inhibited. Makeup water for supplying the water evaporated from the cooling water is supplied to the pit 15 by the makeup water supply means, and the cooling water including the agent is adjusted so as to obtain a certain amount of the pit. The cooling water including the agent stored in the pit is transferred from the outlet of the open type cooling tower 10 to the heat exchanger 30 through the circulating water channel. By repeating this, the heat generated in the heat exchanger 30 can be taken away well. Thermometers for measuring the water temperature of the cooling water may be installed at the inlet and outlet of the open type cooling tower 10 in order to measure the cooling temperature.

The cooling temperature of the open type or enclosed type cooling tower during water system operation may be the average cooling water temperature calculated from the average value of the water temperature at the inlet of the cooling tower and the average value of the water temperature at the outlet of the cooling tower.

Further, the (a) dynamic contact angle and (b) bubble bulkiness of the cooling water including the agent can be measured by measuring apparatuses such as a dynamic contact angle measuring apparatus and a bubble bulkiness measuring apparatus according to the above-described <Properties of Cooling Water to Which Agent Including Surfactant Is Added>. The measurement place is preferably the pit 15 or outlet of the open type cooling tower. The measurement results are transmitted to a control part for controlling the preparation of the cooling water.

Based on the measurement results, the control part can adjust agent injection and/or makeup water supply so that the cooling water including the agent satisfies the conditions of (a) a dynamic contact angle of 55° or less and (b) a bubble bulkiness of 250 mL or less. The control part may control the operation of measuring apparatuses such as the thermometers and may transmit and receive signals such as the results of measurement by these and instructions to these. The control part may perform the operation, management, and the like of the open or enclosed circulating cooling water system, the open type or enclosed type cooling tower, and the like.

As one example, the control part determines whether or not the cooling water including the agent satisfies the conditions of the (a) dynamic contact angle and the (b) bubble bulkiness described above. The control part may perform the following steps S100 and/or S200 based on the determination result to prepare such cooling water as to satisfy the conditions of the (a) dynamic contact angle and the (b) bubble bulkiness described above. It is also possible to prepare such cooling water as to satisfy the conditions of the (a) dynamic contact angle and the (b) bubble bulkiness described above by the manual operation of an operator.

(Step S100: Adjustment of (a) Dynamic Contact Angle)

When the predetermined (a) dynamic contact angle is not satisfied and is exceeded, the control part determines that the content of the surfactant in the cooling water is insufficient. When the content of the surfactant is insufficient, the control part instructs or controls the agent injection means 17 to start the injection of the agent including the surfactant or increase the amount injected, in the agent injection place (preferably the pit 15). And/or the control part instructs or controls the makeup water supply means 16 to stop the supply of the makeup water or decrease the amount supplied, in the makeup water supply place (preferably the pit 15).

(Step S200: Adjustment of (b) Bubble Bulkiness)

When the predetermined (b) bubble bulkiness is not satisfied and is exceeded, the control part determines that the content of the surfactant in the cooling water is excessive. When the content of the surfactant is excessive, the control part instructs or controls the agent injection means 17 to stop the injection of the agent including the surfactant or decrease the amount injected, in the agent injection place (preferably the pit 15). And/or the control part instructs or controls the makeup water supply means 16 to start the supply of the makeup water or increase the amount supplied, in the makeup water supply place (preferably the pit 15).

The present invention can provide a method for operating a circulating cooling water system having a cooling tower, including the measurement step of measuring the (a) dynamic contact angle and (b) bubble bulkiness of the cooling water used in the cooling tower, and the agent adjustment step of adjusting an agent including a surfactant so that the cooling water used in the cooling tower satisfies (a) a dynamic contact angle of 55° or less and (b) a bubble bulkiness of 250 mL or less.

Further, in the agent adjustment step, the amount of the agent including the surfactant injected and/or the amount of makeup water supplied are preferably adjusted. The cooling tower is preferably the water spraying type. The cooling tower may be either the open type or the enclosed type but is preferably an open type cooling tower. The circulating cooling water system may be either open or enclosed but is preferably an open circulating cooling water system.

The method for operating a circulating cooling water system having a cooling tower, including the measurement step and the agent adjustment step according to the present invention described above may be applied to the method for improving the cooling performance of a cooling tower, and the method for preparing cooling water.

It is also possible to implement a method of the present invention by an apparatus (for example, a computer, a notebook computer, a desktop personal computer, a tablet PC, a PLC, a server, or a cloud service) for carrying out or managing a method such as the method for improving the cooling performance of a circulating cooling water system, the method for operating a circulating cooling water system, or the method for preparing cooling water used in this described above, or by a control part provided in the apparatus (the control part includes a CPU and the like). It is also possible to store a method of the present invention as a program in hardware resources including a record medium (a nonvolatile memory (a USB memory or the like), an SSD (Solid State Drive), an HDD (Hard Disk Drive), a CD, a DVD, Blu-ray, or the like) and the like and implement the method of the present invention by the control part. It is also possible to provide an apparatus including the control part or a system for the improvement of the cooling performance of a circulating cooling water system, or the like in which the (a) dynamic contact angle and (b) bubble bulkiness of cooling water are controlled by the control part, such as the system. The management apparatus may include an input part such as a touch panel or a keyboard, a communication part such as a network, a display part such as a touch panel or a display, and the like.

As one example, the present invention can provide a program for allowing a computer to implement the operation of a circulating cooling water system having a cooling tower, including the function of measuring the (a) dynamic contact angle, (b) bubble bulkiness of the cooling water used in the cooling tower, and the function of adjusting an agent including a surfactant so that the cooling water used in the cooling tower satisfies (a) a dynamic contact angle of 55° or less and (b) a bubble bulkiness of 250 mL or less, and the present invention is not limited to this. The cooling tower is preferably the water spraying type. The cooling tower may be either the open type or the closed type but is preferably the open type. The circulating cooling water system may be either open or closed but is preferably an open circulating cooling water system.

The present technique can adopt the following configurations.

[1]

A method for improving cooling performance of a cooling tower in a circulating cooling water system having the cooling tower, wherein cooling water used in the circulating cooling water system is cooling water to which an agent including a surfactant is added, and the cooling water satisfies (a) a dynamic contact angle of 55° or less and (b) a bubble bulkiness of 250 mL or less. The cooling tower is preferably the water spraying type. The cooling tower may be either an open type cooling tower or a closed type cooling tower, and the circulating cooling water system may be either an open circulating cooling water system or a closed circulating cooling water.

[2]

A method for preparing cooling water used in a circulating cooling water system having a cooling tower, including adding an agent including a surfactant to cooling water in the cooling water system to prepare cooling water having (a) a dynamic contact angle of 55° or less and (b) a bubble bulkiness of 250 mL or less. The cooling tower is preferably the water spraying type.

[3]

A method for operating a circulating cooling water system having a cooling tower, including adding an agent including a surfactant so that cooling water used in the circulating cooling water system satisfies (a) a dynamic contact angle of 55° or less and (b) a bubble bulkiness of 250 mL or less. The cooling tower is preferably the water spraying type.

[4]

A method including a measurement step of measuring an (a) dynamic contact angle, (b) bubble bulkiness of cooling water used in a cooling tower, and an agent adjustment step of adjusting an agent including a surfactant so that the cooling water used in the cooling tower satisfies (a) a dynamic contact angle of 55° or less and (b) a bubble bulkiness of 250 mL or less.

The method according to any of the [1] to [3] is preferably a method for improving the cooling performance of a cooling tower in a circulating cooling water system having the cooling tower, a method for preparing cooling water used in a circulating cooling water system having a cooling tower, or a method for operating a circulating cooling water system having a cooling tower.

For the method according to any of the [1] to [3], an open type cooling tower and/or an open circulating cooling water system are preferred, and an open circulating cooling water system having an open type cooling tower may further include a closed type cooling tower.

[5]

The method according to any one of the [1] to [4], wherein the surfactant is a nonionic surfactant.

[6]

The method according to any one of the [1] to [5], wherein the surfactant is a polyoxyalkylene alkyl ether.

[7]

The method according to any one of the [1] to [6], wherein an amount of the surfactant used is 200 to 900 mg/L in the cooling water.

[8]

The method according to any one of the [1] to [7], wherein the cooling water has a dynamic contact angle of 52° or less and a bubble bulkiness of 230 mL or less.

[9]

The method according to any one of the [1] to [8], including the following (a) and (b).

The (a) the dynamic contact angle (°) of the cooling water is the dynamic contact angle of the cooling water to which the agent is added (4 μL, 25° C.), 1 s after dropping when the cooling water is dropped on a test plate at room temperature (25° C.). The test plate is preferably a plate made of a hard vinyl chloride resin.

(b) The bubble bulkiness (mL) of the cooling water is the bubble bulkiness when 300 mL of the cooling water to which the agent is added is aerated at 2 mL/min for 20 s.

[10]

An apparatus for carrying out or managing any one method of the [1] to [9]. The apparatus may include a control part including a CPU and the like.

[11]

A circulating cooling water system having a cooling tower configured to carry out or manage any one method of the [1] to [9]. The circulating cooling water system may be an open circulating cooling system or a closed circulating cooling water system. The circulating cooling water system may be a circulating cooling water apparatus or a circulating cooling water plant.

[12]

A circulating cooling water system having a cooling tower, including a cooling tower, a circulating water channel including a transfer pump, a heat exchanger, and an apparatus for carrying out or managing any one method of the [1] to [9] and configured so that cooling water can circulate between these. The circulating cooling water system may be an open circulating cooling system or a closed circulating cooling water system. The circulating cooling water system may be a circulating cooling water apparatus or a circulating cooling water plant.

EXAMPLES

Embodiments of the present invention will be described by giving the following Examples, Comparative Examples, and the like. The scope of the present invention is not limited to the Examples and the like.

Test Examples 1 to 3 were performed with the following <Cooling Tower Tests> and the conditions of the test water shown in Tables 1 to 3, and the respective test results are shown in Tables 1 to 3.

<Cooling Tower Tests>

The passage of test water heated to 35° C. through an open type circular counterflow type cooling tower (NS cooling tower, manufactured by NIPPON PISTON RING CO., LTD.) was started at a flow rate of 35 L/min, and the cooling water was subjected to cooling treatment in the cooling tower, and the cooling water was circulated from the cooling tower to a heat exchanger. When 30 min elapsed after the passage of water was started, the water temperature (° C.) of the cooling water at the inlet and outlet of the cooling tower was measured. The water temperature (° C.) when the heated cooling water passing through the heat exchanger entered the inlet of the cooling tower was taken as the water temperature of the cooling water at the inlet of the cooling tower, and the water temperature (° C.) when the cooling water exited the outlet of the cooling tower was taken as the water temperature of the cooling water at the outlet of the cooling tower. The respective water temperatures of the cooling water in the cooling tower were obtained, and the temperature difference between the water temperature at the inlet and the water temperature at the outlet was taken as the cooling temperature (° C.).

Evaluations were carried out by collecting the cooling water under conditions in which the fan of the cooling tower rotated. During the test, whether the bubbles in the cooling tower increased over time was visually checked.

The pH (25° C.) of the cooling water to which a surfactant was added was 7.8 to 8.0. The water temperature of the cooling water was within the range of 10 to 50° C.

<Open Type Circular Counterflow Type Cooling Tower>

| NS cooling tower (manufactured by Nihon Spindle Manufacturing Co., Ltd.) | |
| --- | --- |
| Model | CTA-10NL |
| Cooling capacity | 45.35 kW |
| Amount of water treated | 7.8 t/h (130 L/min) |
| Fillers | made of hard vinyl chloride resin |

In the basic configuration of the open type circular counterflow type cooling tower used in the present Examples, the heat exchanger is arranged outside the cooling tower, and the cooling tower has a circulating water channel through which cooling water can circulate between the cooling tower and the heat exchanger. An open circulating cooling water system having an open type cooling tower includes a cooling tower, a heat exchanger, and a circulating water channel and is configured to cool a heat source.

In more detail, the open type circular counterflow type cooling tower is an open type counterflow type cooling tower that cools open circulating cooling water passing through a heat exchanger, includes water spraying means for spraying the cooling water on fillers, air blowing means for blowing the air into the fillers, and a filler region including the fillers configured to cool the cooling water by bringing the cooling water into contact with the air to evaporate it, and is configured so that an agent including a surfactant is added to the cooling water. The cooling tower has the configuration of the water spraying type. In the filler region, a plurality of fillers made of a hard vinyl chloride resin are present, and the plurality of fillers are arranged in a laminated form so that the air can pass.

Further, a flow channel for supplying makeup water for compensating for the loss due to the evaporation and scattering of the cooling water, and an agent injection flow channel for injecting an agent into the cooling water are connected to the cooling tower. By the supply of the makeup water, the water level in the pit can be kept constant. An agent can be injected into the cooling water in the pit.

<Test Water>

In Test Examples 1 to 3, the following surfactants were used. Cooling water to which the surfactant was added so as to obtain a concentration (mg/L) shown in Tables 1 and 2 in the cooling water was used as test water.

Polyoxyethylene-polyoxypropylene block polymer: BASF product Burst EP6200

Polyoxyalkylene alkyl ether A: BASF product PLURAFAC LF901 (mono(2-propylheptyl) ether of ethylene oxide-propylene oxide polymer (CAS No.: 166736-08-9))

Polyoxyalkylene alkyl ether B: Kurita Water Industries product KURIFOAM C-803

Sodium alkyl diphenyl ether disulfonate: Sanyo Chemical Industries product SANDET ALH <Dynamic Contact Angle Evaluation Test>

The contact angle 1 s after the point in time when test water (4 µL, 25° C.) was dropped on a hard vinyl chloride plate of the same material as the cooling tower fillers was measured at room temperature (25° C.) using a dynamic contact angle test apparatus (DAT1100 MkII Dynamic Absorption Tester, manufactured by FIBRO).

For the test water, cooling water when it exited the outlet of the cooling tower was collected between the cooling tower and the heat exchanger as the test water.

For the hard vinyl chloride plate used in the dynamic contact angle evaluation test, a Yuni Sunday vinyl chloride sheet (EB235-5, manufactured by Hikari) was used. The hard vinyl chloride plate used in the test had a surface on which when "pure water (ion-exchanged water)" was dropped instead of the "test water", the dynamic contact angle of the pure water was 69.7° on average (two measurements: 72.2° and 67.1°).

When the dynamic contact angle was 55° or less, the cooling temperature (° C.) increased and was good. Therefore, a dynamic contact angle of 55° or less was considered acceptable.

<Dynamic Contact Angle Test Apparatus 1100DAT MkII>

The dynamic contact angle test apparatus can dynamically evaluate a contact angle correlating to surface size properties. The dynamic contact angle test apparatus can measure contact angles (wetting properties), dropping liquid volume (absorption properties), and droplet diameters (spread) with respect to time changes by image analysis by a CCD camera.

Liquid surface tension can be measured by the pendant drop method.

Shutter rate: 0.001 s

Measurement intervals: 0.02 s (50 images/s)

In accordance with ASTM D5725

<Foamability Evaluation Test>

300 mL of test water (25° C.) was added to a graduated cylinder having a volume of 1 L, and an air diffusing pipe was arranged at the bottom of the graduated cylinder having a volume of 1 L. The air was fed into the test water at 2 mL/min using the air diffusing pipe to start aeration, and for the bubble bulkiness 20 s after the start of aeration, the mark on the graduated cylinder was read. The value of this volume (mL) when the test water was foamed—the volume before foaming, 300 mL, was taken as the foamability (mL), and this was the evaluation of the foamability.

As the evaluation criterion, no increase of bubbles in the cooling tower occurred with a foamability of 250 mL or less, and therefore this foamability of 250 mL was considered acceptable.

For the test water, cooling water when it exited the outlet of the cooling tower was collected between the cooling tower and the heat exchanger as the test water.

Graduated cylinder having a volume of 1 L: inner diameter 58 mm, mark 10 mL, ASTM tolerance: 6±mL.

Air diffusing pipe: manufactured by Asahi Glassplant Inc., ball filter 3970-20/3, filter diameter 20 mm, pipe diameter 8 mm, pores 20 to 30 µm.

Test Example 1

In Test Example 1, the above <Cooling Tower Tests> were performed with each surfactant and the concentration of the surfactant in the test water shown in Table 1. As a result, even at the same concentration, the hydrophilization performance differed depending on the type of the surfactant. In addition, as the concentration of the surfactant increased, the hydrophilization performance improved.

TABLE 1

Dynamic Contact Angle Evaluation Test Results

| | Test water | | Evaluation Dynamic contact angle (°) |
|---|---|---|---|
| | Surfactant | (Concentration) | |
| Comparative Example 1 | No | — | 72 |
| Comparative Example 2 | Polyoxyethylene-polyoxypropylene condensate | 500 mg/L | 58 |
| Comparative Example 3 | Sodium oleate | 500 mg/L | 65 |
| Comparative Example 4 | Polyoxyalkylene alkyl ether A | 150 mg/L | 57 |
| Comparative Example 5 | Polyoxyalkylene alkyl ether A | 300 mg/L | 52 |
| Comparative Example 6 | Polyoxyalkylene alkyl ether A | 500 mg/L | 50 |
| Comparative Example 7 | Polyoxyalkylene alkyl ether A | 1000 mg/L | Less than lower limit value |
| Comparative Example 8 | Polyoxyalkylene alkyl ether B | 500 mg/L | 50 |

Test Example 2

In Test Example 2, the above <Cooling Tower Tests> were performed with each surfactant and the concentration of the surfactant in the test water shown in Table 2. As a result, even at the same concentration, the foamability differed depending on the type of the surfactant. As the concentration of the surfactant increased, the foamability increased.

TABLE 2

Foamability Test

| Test water Surfactant | | Concentration | Evaluation Foamability(mL) |
|---|---|---|---|
| Comparative Example 1 | No | — | 50 |
| Comparative Example 2 | Polyoxyethylene-polyoxypropylene condensate | 500 mg/L | 200 |
| Comparative Example 3 | Polyoxyalkylene alkyl ether A | 150 mg/L | 200 |
| Comparative Example 4 | Polyoxyalkylene alkyl ether A | 300 mg/L | 230 |
| Comparative Example 5 | Polyoxyalkylene alkyl ether A | 500 mg/L | 200 |
| Comparative Example 6 | Polyoxyalkylene alkyl ether A | 1000 mg/L | 350 |
| Comparative Example 7 | Polyoxyalkylene alkyl ether B | 300 mg/L | 700 |
| Comparative Example 8 | Sodium alkyl diphenyl ether disulfonate | 500 mg/L | 700 or more | surfactant (preferably the nonionic surfactant) was added was below 55°, the cooling temperature increased. In addition, a relationship was obtained in which when the bubble bulkiness (foamability) of the cooling water to which the surfactant (preferably the nonionic surfactant) was added was 250 mL or less, no increase of bubbles in the cooling tower was seen.

From these, by adding a surfactant (preferably a nonionic surfactant) to cooling water so that the dynamic contact angle of the cooling water is 55° or less and the bubble bulkiness of the cooling water is 250 mL or less, cooling water with which the cooling performance of a cooling tower improves can be obtained. By using this cooling water, the cooling performance of a cooling tower can be improved. By preparing and using the cooling water, the cooling performance of a cooling tower can be easily improved, and therefore the operation of circulating cooling water can be easily performed. In addition, since the cooling water is prepared and used, a cooling tower need not be specially converted, existing equipment may be used, and the cooling performance of a cooling tower can be easily improved. Further, the cooling tower is preferably a water spraying type cooling tower including at least water spraying means and a filler region. In addition, the cooling tower may be either the open type or the closed type but is preferably an open type cooling tower. The circulating cooling water system may be either an open circulating cooling water system or a closed circulating cooling water system but is preferably open circulating cooling water.

TABLE 3

Cooling Tower Test Results

| | Test water | | Evaluation | | | |
|---|---|---|---|---|---|---|
| | Surfactant | Concentration | Dynamic contact angle(°) | Foamability (mL) | Cooling temperature (° C.) | increase of bubbles in cooling tower |
| Comparative Example 1 | No | — | 72 | 50 | 14 | No |
| Comparative Example 2 | Polyoxyalkylene alkyl ether A | 150 mg/L | 57 | 200 | 14 | No |
| Comparative Example 3 | Polyoxyalkylene alkyl ether A | 1000 mg/L | Less than lower limit value | 350 | 16 | Yes |
| Example 1 | Polyoxyalkylene alkyl ether A | 300 mg/L | 52 | 230 | 16 | No |
| Example 2 | Polyoxyalkylene alkyl ether A | 500 mg/L | 50 | 200 | 16 | No |

Test Example 3

In Test Example 3, the above <Cooling Tower Tests> were carried out with each surfactant and the concentration of the surfactant in the test water shown in Table 3. The polyoxyalkylene alkyl ether A that was a nonionic surfactant in which the characteristics of high hydrophilization performance and low foamability were seen was used. As a result, when the surfactant (preferably the nonionic surfactant) was contained in cooling water so as to obtain 300 mg/1 L of cooling water or more, the cooling temperature in the cooling tower increased (Comparative Examples 1, 2, and 3 and Examples 1 and 2).

In addition, a relationship was obtained in which when the dynamic contact angle of the cooling water to which the

REFERENCE SIGNS LIST 1 open circulating cooling water system,
10 open type cooling tower,
11 air blowing means,
12 water spraying means,
13 filler region,
14 space,
15 pit,
16 makeup water supply means,
17 agent injection means,
18 louver,
20 circulating water channel,
21 transfer pump,
30 heat exchanger

What is claimed is:

1. A method for improving cooling performance of a cooling tower in a circulating cooling water system having the cooling tower, comprising:
measuring a dynamic contact angle and a bubble bulkiness of cooling water;
controlling an amount of an agent to be added to the cooling water by determining whether the cooling water satisfies following conditions:
(a) the dynamic contact angle of 55° or less; and
(b) the bubble bulkiness of 250 mL or less, wherein the agent comprising a surfactant; and
adjusting and adding the agent to the cooling water in the circulating cooling water system by increasing the amount of the agent when the measured dynamic contact angle exceeds 55° and decreasing the amount of the agent when the measured bubble bulkiness exceeds 250 mL.

2. The method for improving cooling performance according to claim 1, wherein the surfactant is a nonionic surfactant.

3. The method for improving cooling performance according to claim 1, wherein the surfactant is a nonionic ether-based surfactant.

4. The method for improving cooling performance according to claim 1, wherein the surfactant is a polyoxyalkylene alkyl ether.

5. The method for improving cooling performance according to claim 1, wherein the cooling water is controlled to have a dynamic contact angle of 52° or less and a bubble bulkiness of 230 mL or less.

6. A method for preparing cooling water used in a circulating cooling water system having a cooling tower, comprising:
measuring a dynamic contact angle and a bubble bulkiness of cooling water;
controlling an amount of an agent to be added to the cooling water by determining whether the cooling water satisfies following conditions:
(a) the dynamic contact angle of 55° or less; and
(b) the bubble bulkiness of 250 mL or less, wherein the agent comprising a surfactant;
adjusting and adding the agent to the cooling water in the circulating cooling water system by increasing the amount of the agent when the measured dynamic contact angle exceeds 55° and decreasing the amount of the agent when the measured bubble bulkiness exceeds 250 mL.

7. A method for operating a circulating cooling water system having a cooling tower, comprising:
measuring a dynamic contact angle and a bubble bulkiness of cooling water;
controlling an amount of an agent to be added to the cooling water by determining whether the cooling water satisfies following conditions:
(a) the dynamic contact angle of 55° or less; and
(b) the bubble bulkiness of 250 mL or less, wherein the agent comprising a surfactant;
adjusting and adding the agent to the cooling water in the circulating cooling water system by increasing the amount of the agent when the measured dynamic contact angle exceeds 55° and decreasing the amount of the agent when the measured bubble bulkiness exceeds 250 mL.

8. The method for operating the circulating cooling water system according to claim 7, wherein the surfactant is a nonionic surfactant.

9. The method for operating the circulating cooling water system according to claim 7, wherein the surfactant is a nonionic ether-based surfactant.

10. The method for operating the circulating cooling water system according to claim 7, wherein the surfactant is a polyoxyalkylene alkyl ether.

11. The method for operating the circulating cooling water system according to claim 7, wherein the cooling water is controlled to have a dynamic contact angle of 52° or less and a bubble bulkiness of 230 mL or less.

12. The method for operating the circulating cooling water system according to claim 7, wherein the operation of the circulating cooling water system is an operation of a circulating cooling water system for improving cooling performance.

* * * * *